A. H. Lorton,
Potato Masher.
N° 33,654. Patented Nov. 5, 1861.

Witnesses,
S. J. McDougall
E. Harry Smith

Inventor
Alfred H. Lorton

UNITED STATES PATENT OFFICE.

ALFRED H. LORTON, OF NEW YORK, N. Y.

IMPROVED POTATO-MASHER.

Specification forming part of Letters Patent No. 33,654, dated November 5, 1861.

*To all whom it may concern:*

Be it known that I, ALFRED H. LORTON, of the State, city, and county of New York, have invented an Improved Mashing Utensil or Pulverizer; and I do hereby declare that the following is a full, clear, and exact description of the same, reference being had to the accompanying drawings, which form part of this specification, in which—

Figure 1:
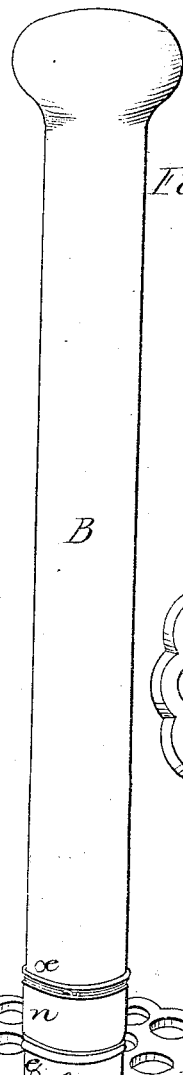
Figure 3:
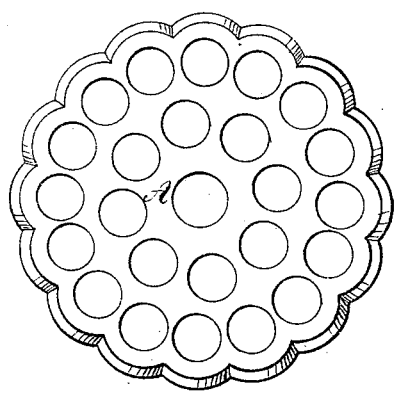
Figure 2:
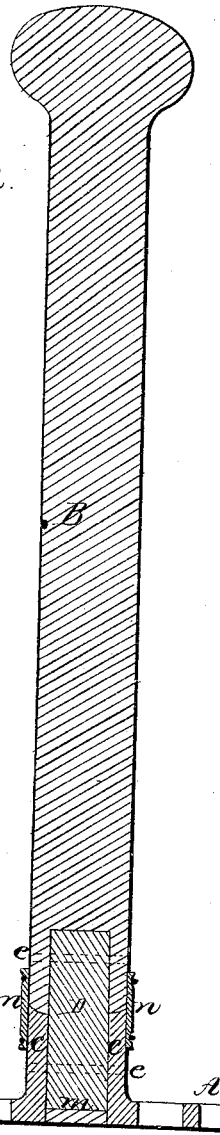

Figure 1 is a perspective view. Fig. 2 is a vertical section, and Fig. 3 is an end view of the disk.

My said invention relates to a new manufacture consisting of a pulverizing implement for culinary uses, but particularly for the purpose of mashing or crushing potatoes, turnips, and other vegetables; and said invention is comprised, practically, in a perforated disk provided with a suitable handle.

To enable others to make and use my invention, I will proceed to describe the same.

Referring to the drawings, (wherein the marks of reference correspond in all the figures,) A is the disk, and B is the handle.

My invention in its most perfect form has an elastic or yielding medium to connect the disk with the handle, so that the disk will be permitted to oscillate on the end of the handle in any direction, and thus accommodate itself to the inequalities of surface of the mass or body of material to be mashed or pulverized; but in its simplest and cheapest form the handle is simply driven into a socket c, (shown in section in Fig. 2,) making a rigid connection between the handle and perforated disk. The perforations are very important, as they form a reticulated surface, which is of great advantage in reducing the material, on account of the numerous edges presented around the interstices, the latter at the same time affording the requisite space to allow the pieces or mass, as the case may be, properly to separate. An implement made on my said plan is capable of doing a given amount of labor in one-tenth the time usually required, on account of the absolute certainty with which everything coming under it is completely reduced to the desired divisibility, and more thoroughly than is possible with those in general use. The perforations may be of any desired form; but I prefer to have them round, as the instrument is more readily cleared when the holes in the disk present no sharp corners.

The instrument, though answering a very good purpose when made rigid, as last above mentioned, will not act so satisfactorily as when constructed so as to yield, as first above set forth. To make the connection between the handle and disk, so as to combine the said yielding capacity, I generally employ a core of india-rubber D, which is inserted in a socket in the end of the handle, and also in the socket c. It is secured in each by pins e e, passing through the sockets and core, as shown in dotted lines in Fig. 2, or in any convenient way. The exterior of the socket c and the handle are of about the same size, and around both I stretch a sleeve of india-rubber n and secure it to both handle and socket c of the disk by a piece of wire wound tightly around near each end of the sleeve n, drawing the wire sufficiently close to press the rubber into small grooves in the handle and sockets c, so as to prevent the sleeve from moving. m is a false bottom for the socket c, set in to protect the core D.

In the above invention I do not confine myself to the precise construction shown in the drawings, but contemplate making the implement both with and without the yielding feature; nor do I confine myself to the precise method of applying the elastic or yielding material. I sometimes make them without the core and with the sleeve, or vice versa; and other means of fastening the india-rubber may also be devised.

What I claim as my invention, and desire to secure by Letters Patent, is—

The perforated pulverizer or potato-masher, constructed substantially as described, as a new article of manufacture.

ALFRED H. LORTON.

Witnesses:
S. T. MCDOUGALL,
E. HARRY SMITH.